F. BARTZ.
MEAT CUTTER.
APPLICATION FILED SEPT. 5, 1907.
930,920.
Patented Aug. 10, 1909.
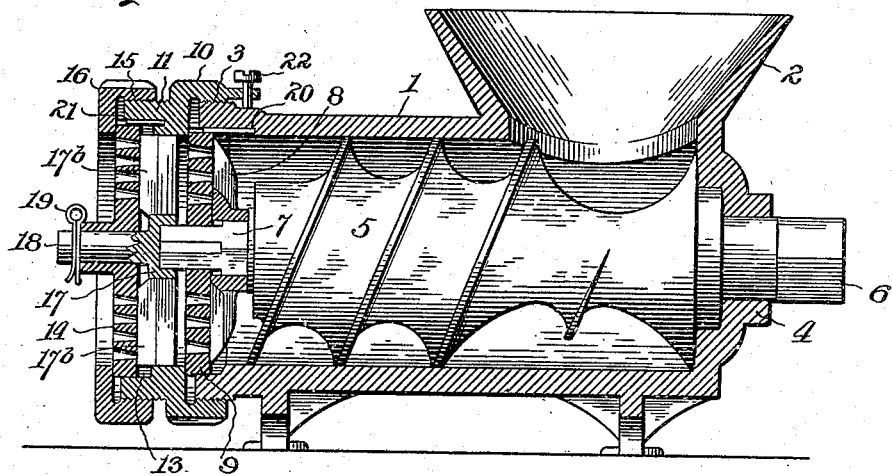
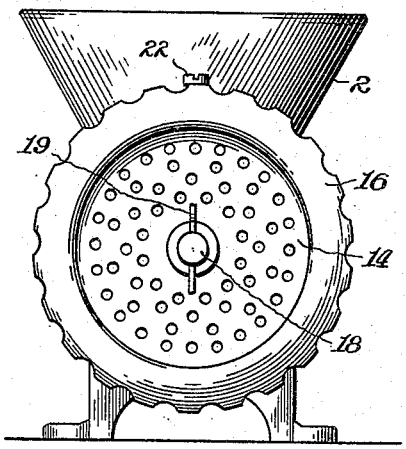
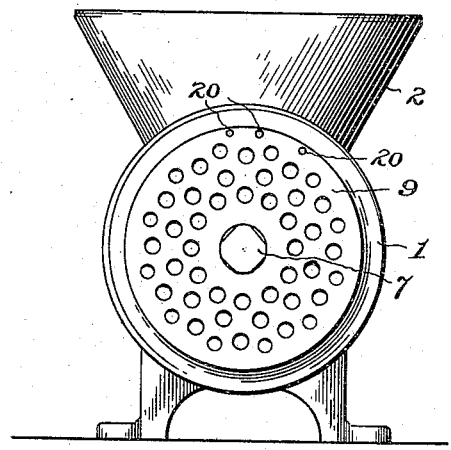
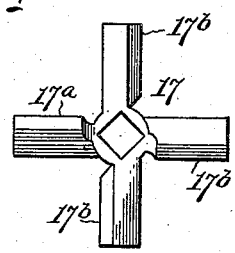
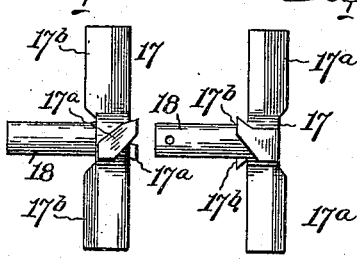
Frank Bartz,
Inventor,
Witnesses
R. J. Beall.
W. J. Duvall
By John B. Thomas & Co.
Attorneys

UNITED STATES PATENT OFFICE.

FRANK BARTZ, OF HORNELL, NEW YORK, ASSIGNOR TO THE A. J. DEER CO., OF HORNELL, NEW YORK, A CORPORATION OF NEW YORK.

MEAT-CUTTER.

No. 930,920.	Specification of Letters Patent.	Patented Aug. 10, 1909.

Application filed September 5, 1907. Serial No. 391,484.

*To all whom it may concern:*

Be it known that I, FRANK BARTZ, a citizen of the United States, residing at Hornell, in the county of Steuben and State of New York, have invented certain Improvements in Meat-Cutters, of which the following is a complete specification.

This invention is an improvement in meat-cutters, and relates more particularly to the class of rotary cutters in which the meat is fed by a screw through a perforated plate over one face of which latter operates a rotary knife to cut the meat into small pieces or particles as it passes through the perforations in the plate. In rotary cutters of this character, and where it is desired to cut or divide the meat into very small particles, the usual operation is to feed the meat first through a perforated plate having comparatively large holes and then through a second plate having smaller holes, rotary cutters or knives operating in conjunction with said plates, and in those machines in which provision is made for only a single perforated plate it is necessary to change one plate for another during the operation of cutting the meat, the plates being removable for this purpose.

The primary object of my invention is to provide a rotary meat cutting machine having two plates or disks spaced apart and having perforations of different sizes, in conjunction with rotary cutting knives operating over the faces of the perforated plates or disks and one of said cutting knives adapted to feed the partially chopped meat from one perforated plate to the other so that it will be cut into very small particles as it passes out of the machine.

A further object of my invention is to so construct the several separable parts of the machine that it will not require any skill in assembling them.

Other though minor objects of my invention will hereinafter appear, and what I claim as new will be specifically set forth in the appended claims.

In the accompanying drawings, which form a part of this specification:—Figure 1 is a sectional view of a rotary meat cutting machine constructed in accordance with my invention. Fig. 2 is an end view of the machine. Fig. 3 is an end view with parts removed to show the first or inner perforated plate and means for preventing rotation of the same. Figs. 4, 5 and 6 are detail views of the cutting knife which is located between the perforated plates or disks.

Like numerals of reference indicate like parts in all the figures of the drawings.

Referring to said drawings, 1 designates the cylinder or barrel of the meat-cutter, and the same is provided at one end with a hopper 2 and at the other or open end with a thread 3 to receive the adjusting-ring, said cylinder or barrel being also provided with a bearing, as 4, for the feed-screw, said bearing being located at the closed end, as is usual.

In carrying out my invention I employ a feed-screw 5 of the desired pitch and provided at one end with a stub-shaft or gudgeon 6, journaled in the bearing 4, and squared at its outer end, as shown, to receive either a crank-handle or gear wheel, according to whether the machine is to be operated by hand or mechanical power. At the other or outer end of the feed-screw is formed a stub-shaft or gudgeon 7 squared to receive a rotary knife 8 of ordinary construction, and beyond the knife the edges of said shaft or gudgeon are rounded, as shown, so as to have a bearing in a circular opening in a perforated plate or disk 9, the latter being adapted to take into the cylinder or barrel 1 and bear against the rotary cutting-knife 8 so that the latter will operate over the inner face thereof. This plate or disk 9 is provided with the usual slightly tapering perforations, which in the present instance are larger than those in a second plate or disk hereinafter referred to. The perforated plate or disk 9 is adjusted up to the cutting-knife in the usual manner by means of an internally threaded ring 10, and in the present instance this ring is provided with a rearwardly-projecting annular flange 11 adapted to form a chamber in the rear of the perforated plate or disk 9, said flange at its outer end being countersunk, as at 13, to receive a second perforated plate or disk 14, and externally threaded, as at 15, to receive an adjusting ring 16 for said latter plate. In the present instance the flanged adjusting-ring 10 is of such width as to provide a comparatively shallow chamber between the perforated plates or disks 9 and 14, but as will be obvious said adjusting ring may be made of greater width to correspondingly increase the depth of the auxiliary chamber. Located in this auxiliary chamber, and between the perforated plates or disks 9 and 14 is a rotary knife 17, which is of such peculiar construction that it will not only serve to cut the meat as it passes through each perforated plate or disk, but will also serve to feed the meat through the auxiliary chamber from one perforated plate to the other. This knife is driven by the feed-screw, for which purpose the former is provided with a square socket (see Fig. 4) to receive the squared or flattened outer end of the stub-shaft or gudgeon 7. Said knife 17 also has a bearing in the outer perforated plate or disk 14, and therefore is provided with a gudgeon 18 extending through a central opening in said plate or disk, the latter having a hub, as shown, to increase the bearing surface, and for the purpose of connecting these parts so that they may be removed together a cotter-pin 19 is passed through a perforation in the outer projecting end of the gudgeon beyond the end of the hub.

The rotary knife 17 is provided with two sets of cutting blades, 17$^a$ and 17$^b$, which bear against the perforated plates 9 and 14, respectively, so as to operate over the opposing faces of said plates. It will be noted, therefore, that the blades 17$^a$ of the rotary knife 17 operate on one side of the perforated plate 9 while the knife 8 operates on the other side of the same, and that the blades 17$^b$ of the said knife 17 operate against the inner face of the outer perforated plate or disk 14. By reference to Figs. 4, 5 and 6 it will be seen that the blades 17$^a$ are constructed and arranged after the manner of a propeller-blade, that is to say having the side directly in rear of the forward or cutting edge disposed at an angle, so that when said knife is turned these blades will act to push the meat toward the perforated plate 14. The other blades, 17$^b$, have a slightly projecting cutting edge, and adjoining this edge is a flat side extending substantially parallel with the axis of the cutter. This cutting knife is preferably made solid or in one piece, as shown in the drawings, but it will be obvious, of course, that the blades which operate against one of the perforated plates may be connected to a hub which is separate from the hub of the blades which operate against the other plate. In each instance there is a clearance between the rear edge of each blade and the adjoining perforated plate, and the cutting blades are all constructed so that they may be easily sharpened in the usual manner, and in this particular it will be noted that the parts are constructed so that the adjusting rings 10 and 16 may take up for any sharpening of the blades.

Instead of providing a single pin 20 to prevent the turning of the perforated plate or disk 9, I provide three pins, as shown in Fig. 3, two of which are spaced a certain distance apart and the third a greater or less distance from one of the others. As will be obvious this provides that said plate can be placed in the cylinder only one way, or with one of its faces always toward the knife 8, and though the other perforated plate or disk is provided with but a single pin, as 21, the hub on said plate will insure its being properly placed on the gudgeon of the rotary knife 17, and the gudgeon on said knife will also insure its being properly placed in the machine.

In order to hold or secure the adjustment of the ring 10 it is provided with a projecting lug to receive a set-screw 22 which is threaded through the lug to impinge on the cylinder or barrel.

The operation of the meat-cutter will be readily understood from the foregoing description, for the meat being placed in the cylinder will be fed to the perforated plate 9 having the large perforations and cut by the rotary knife 8. The pieces which pass through said perforations will be again cut by the blades 17$^a$ of the knife 17 and will be forced by said blades toward the plate 14 having the smaller perforations, and as the meat passes into these perforations it will be again cut by the blades 17$^b$ of the knife. The small particles which pass into the perforations of the plate 14 will then be forced out of the machine by the effect of the cutting-knife or propeller 17. In this manner the meat is operated on by three knives and continuously fed from the hopper or feed end to the outer or discharge end of the machine. It will be noted also that by the peculiar construction of the knives or blades which are located in the auxiliary chamber they not only serve to feed the meat to the outer perforated plate but also act to thoroughly mix the partially cut meat on its passage to said outer perforated plate. On account of this latter operation, therefore, the machine is especially adapted for mixing and mincing meat for sausages and the like.

In case it is desired to cut the meat into particles of a size corresponding with the perforations of a single plate, for instance the plate 9, the other perforated plate, as well as the knife 17, are removed by unscrewing the ring 16, and after removing the flanged ring 10 the ring 16 is substituted therefor.

Having described my invention, I claim:

1. In a meat-cutter, the combination with a cylinder, feed-screw, and two perforated plates located beyond the outer end of the feed-screw and spaced apart, of a knife rotatable between the perforated plates having blades 17$^b$ operating against the outer perforated plate, and separate blades 17$^a$ operating against the inner perforated plate, said blades 17$^a$ being disposed at an angle to said inner plate rearward with respect to the rotation of the knife and having its rear edge a slight distance from the outer plate to leave a space between said blades and said outer plate, whereby the blades 17ª cut the meat from the inner plate and feed it against the outer plate for the operation of the blades 17ᵇ, as herein shown and described.

2. In a meat-cutter, the combination with the cylinder and feed-screw, the latter having a squared gudgeon the outer portion of which is flattened at the corners, a knife mounted on the inner portion of said gudgeon, a perforated plate let into the end of the cylinder and forming a bearing for the outer portion of the gudgeon beyond which bearing said gudgeon projects a slight distance, a rotary knife having at its inner side a square socket adapted to receive the end of the gudgeon and at its outer side a projecting spindle, a perforated plate having an opening through which the spindle projects, and means on the outer end of the spindle for locking the knife and perforated plate together, together with means for adjusting the perforated plates, substantially as shown and described.

3. In a meat-cutter, the combination with the cylinder and removable perforated plate adapted to fit into the end of the same said plate having tapering perforations, of three pins spaced at different distances apart on one of said parts, and recesses or perforations in the other part correspondingly spaced to receive said pins, whereby the plate can engage the pins only when the same is disposed with the wider end of the perforations at the outer side of the plate.

In testimony whereof I have signed my name to this specification in the presence of two subscribing witnesses.

FRANK BARTZ.

Witnesses:
  D. M. HURLBURT,
  L. G. HOLLANDS.